July 19, 1966  V. W. HAMPTON ETAL  3,261,550
TRACKS FOR RAILED TRANSPORT SYSTEMS
Filed July 25, 1961  3 Sheets-Sheet 1
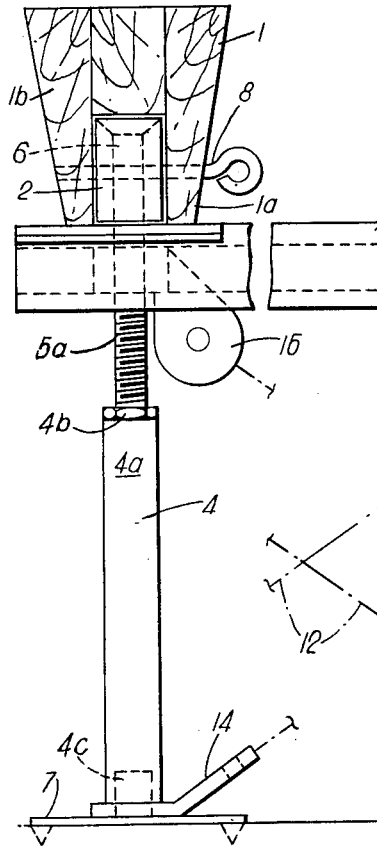
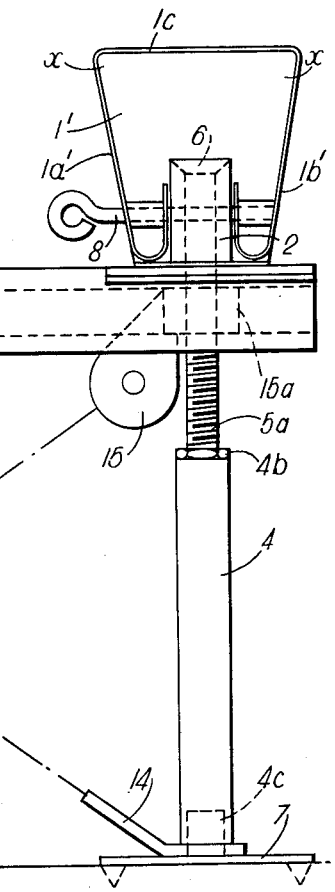
VERNER W. HAMPTON
NORMAN H. F. RENWICK
THOMAS A. JOHNSON
GEORGE D. GREEN
Inventors
Attorneys

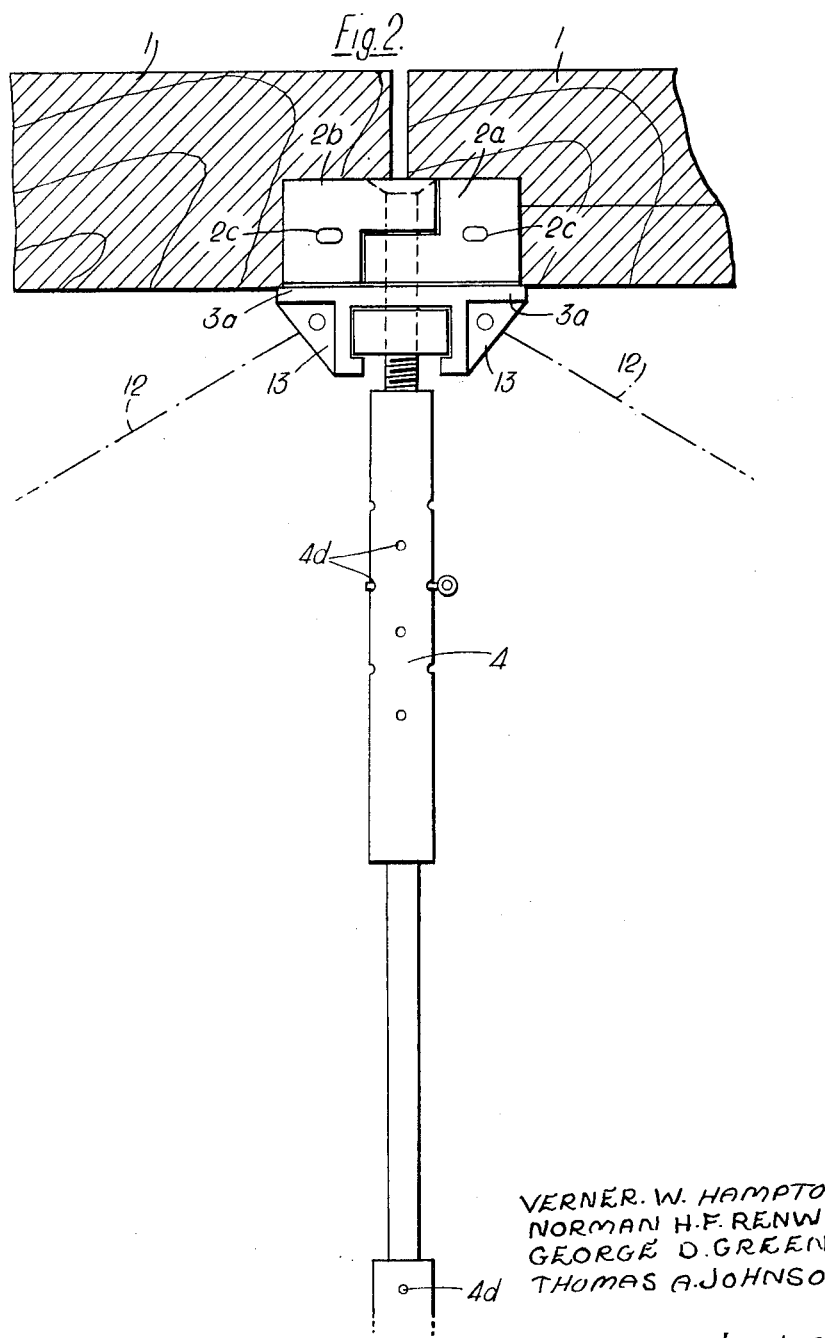

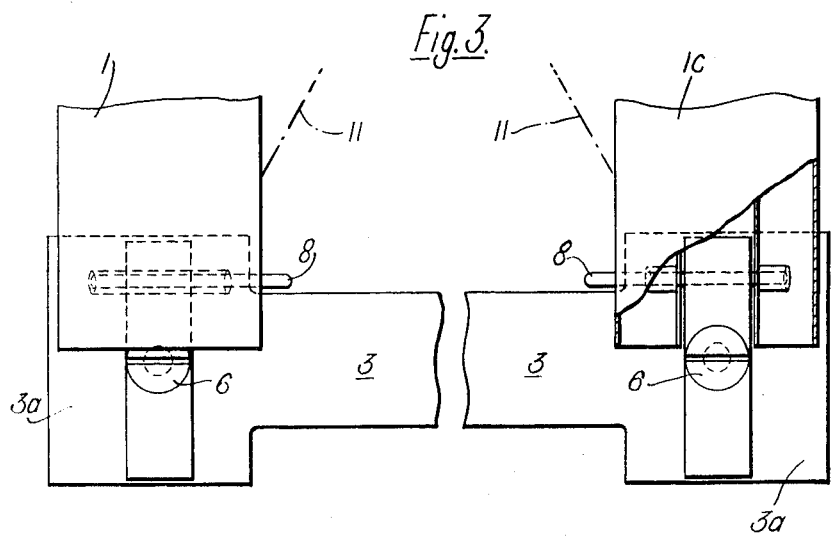
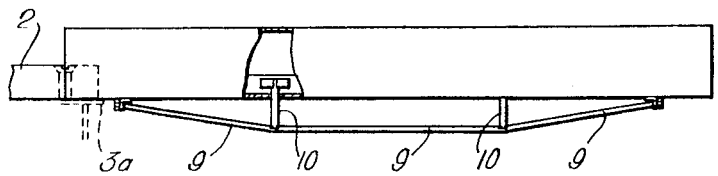

United States Patent Office 3,261,550
Patented July 19, 1966

3,261,550
TRACKS FOR RAILED TRANSPORT SYSTEMS
Verner W. Hampton, Norman H. F. Renwick, George D. Green, and Thomas A. Johnson, Salisbury, Southern Rhodesia, assignors to Pneuways Development Company (Private) Limited, Salisbury, Southern Rhodesia, a Southern Rhodesian company
Filed July 25, 1961, Ser. No. 127,452
Claims priority, application Southern Rhodesia, Aug. 19, 1960, 507/1960
3 Claims. (Cl. 238—3)

This invention relates to railed transport systems and, in particular, provides for such a system a form of twin-rail track in portable sections which are readily assembled for the expeditious laying of the track over more or less undulating terrain, more especially as a temporary track which may have to be dismantled for transportation from one site to another and rebuilt to follow a different route.

The track aforesaid is suitable for railed transport systems the subject of Federation of Rhodesia and Nyasaland Patent No. 297/59 and others, and corresponding patent protection in other countries, but it is not limited to such use.

According to the invention a track comprises readily transportable beams of desired cross-section and standardized length adapted to be assembled in end-to-end continuity to form the respective rails, the junctions between the beams including stout hinges located and supported by transverse headtree or bearer members upon which the twin rails are carried in correct parallel spaced relation and at requisite heights above the more or less undulating ground.

The invention also comprises a track construction as indicated in the preceding paragraph wherein the hinges for providing the rail beam junctions comprise leaves constructed, supported and adapted to function substantially as hereinafter described with reference to the drawings.

The invention further comprises supporting headtrees and other structures substantially as hereinafter set forth.

Other features facilitating wheeled vehicle track construction and generally achieving the objects of this invention will appear from the following description and claims.

The accompanying drawings illustrate various ways of carrying the invention into effect, by way of example, and in these drawings:

FIGS. 1 and 1a are end elevations showing hinges locating at their ends, in a desired spaced arrangement, on a supporting structure two rail beams of which the section profiles are alike;

FIGURE 2 is a fragmentary, part-sectional side elevation corresponding to FIGURE 1, but with a modification of part of the supporting structure;

FIGURE 3 is a fragmentary, part-sectional plan corresponding to FIGURES 1 and 2; and FIGURE 4 is a part-sectional side elevation of a rail beam showing how it may be strengthened for higher loads.

In these drawings the rail-forming beams are indicated by the general reference 1, the hinges by the general reference 2 and the bearers or headtrees by the general reference 3; details of these members being distinguished by addition of subsidiary reference letters to the respective reference numbers.

The hinges 2 which provide the junctions between the rails 1 or 1', comprise fabricated steel leaves 2a, 2b which rest upon the upper surfaces 3a at the ends of the bearer members as 3 and over which complementary section end openings or recesses of the respective rail beams 1 or 1' may be fitted and anchored with a sufficient degree of freedom to allow of expansion and contraction of the rail beams between their ends and also to permit a sufficient angular movement of the hinge leaves laterally on the bearer members for enabling the track, where desired, to follow, in the case of straight beams (as shown in FIGURE 2) of moderate length, slight curvatures in a series of chords; or in the case of precurved or arcuate beam (which it is unnecessary to show), to enable such to be laid to form a track of not greatly dissimilar curvature or curvatures to the curvature of the beams.

The headtrees or transverse bearers 3, which occur below each articulated rail joint or beam hinge in the laid track are steel or like members of the inverted channel section shown, with their ends enlarged by side flanges offering the surfaces 3a. They are adapted to be provided at their opposite ends 3a with downwardly directed extensible supporting struts, legs or pillars as 4, the uppermost elements of which are conveniently screw-threaded extensions 5a, through suitably pitched holes in the headtree or bearer, of the respective hinge pins 6 of the articulated joints. Screwed sleeves as 4a in FIGURE 1, preferably of standardized lengths, fitted over the threaded extensions 5a, provide a convenient means for enabling the effective lengths of the struts to be adjusted and fixed as by locknuts 4b, if necessary also by the addition of any desired number of screwed spigots and further sleeves, the lowest one of which in each strut is adapted to bear upon and be located as shown at 4c by the sole plate 7, spiked or otherwise of suitable construction for firm engagement with the ground over which the track is laid. Height adjustment may be obtained by the alternative means apparent from FIGURE 2 at reference 4d.

Adverting to the rail beams, these may be of lengths standardized at about fifteen feet, and may be of uniform inverted channel section throughout, their open ends admitting with an easy fit the hinge leaves 2a or 2b and being adapted to be fixed thereto as by transverse bolts 8 pushed through inner cheeks 1a of the beams, slotted holes 2c in the respective hinge leaves and into the outer cheeks 1b without passing through the latter.

The rail beams, which are required to be of lightweight construction, may for this purpose be such as are shown in FIGURES 1 and 2, i.e., of hard wood and/or may be fabricated from laths, planks or the like assembled to the desired inverted channel section. They may be internally reinforced as by including webs or other fillings at suitable points along their length, subject to leaving end recesses for fitting over the junction hinge leaves. Alternatively, a rail beam may be fabricated from steel or other metal plate as shown in FIG. 1a at 1', and if desired, so as to provide for the load-carrying vehicle wheels a central top member or running surface 1c with side or cheek members 1a' and 1b' each internally hinged at regions x along the opposite edges of the first so as to permit of their being compacted, for transportation, with the sides or cheeks collapsed about the hinges, respectively over and under the first member.

The external profile of the rail beams or sections, whether as constructed, e.g., in the case of wooden beams or lightweight concrete beams or whether in the laid track, e.g., in the case of compactible, collapsible sided steel or like beams, is preferably symmetrical so that any beam may be suitable for laying either end to the exposed end of a previously laid beam. Thus, where a rail beam has to present a side running surface for vehicle guide wheels and such surface may be required to diverge upwardly, or have a batter, the external profile aforesaid should be trapezoidal as shown; and the channel along the interior of each beam, or the hinge leaf-receiving end recesses thereof, may then be of dovetail section, the cross-section of the hinge leaves being of at least a generally complementary section to secure an adequate fit and connection of the rail beam ends with the respective hinge leaves.

Adequate strength for an individual rail-forming beam or section may be achieved as shown in FIGURE 4 by the inclusion below the beam, to provide a truss structure, as of "catenary" wires or rods 9 tensioned between suitably located end anchorages and one or more downwardly directed intermediately positioned struts as 10, such as may be simply inserted where required upwardly into the channel which extends along the beam, or alternatively into recesses or other formations provided for the purpose, and maintained in position under the tension applied as by wire strainers to the wires or the like. Any desired degree of prestressing of the rail beams may be applied in this way to achieve the requisite strength against deflection of the rails under load.

Spacing, i.e., gauge, of the rails between their articulated and hinge-anchored ends may be provided by suitably distributed tubular or other struts (not shown) bolted or otherwise suitably maintained in position between opposing points on the inner cheeks of the laid rails, preferably also providing diagonally arranged strainer wires as 11 to unite the rails in rigid truss structures. Strainer wires in such or other suitable arrangements may be used additionally to impart or augment curvatures of the portions of track which occur between each pair of headtrees or track bearer members 3.

For obtaining the requisite degree of rigidity of the assembled structure of twin rails traversing the ground on supporting struts or pillars of varying height according to the undulatory nature of the ground, any suitable arrangement of wire ties or tension members as 12 may be provided, for instance, running diagonally from lugs 13 presented at, and integral with, the ends of the headtrees and further lugs 15 collared as at 15a into the channels to suitably distributed ground anchorages such as lugs 14 locked under the pillars. Other such ties may extend between, for instance, lower extremities of the extensible headtree-carrying struts or pillars and suitable attachment points on the rail beams themselves, or at the base of the struts aforementioned, with reference to FIGURE 4, as forming part thereof in some cases.

Detailed design of the several parts for track construction according to this invention is to achieve the highest degree of standardization of the component parts, the minimum number of different parts whereby greatly to simplify and expedite the work in assembling the parts and adapting the track to the nature of the land to be traversed thereby, while achieving thereby a construction of track which is as robust and serviceable as any permanent track constructed in accordance with conventional practice.

Having now particularly described and ascertained our said invention and in what manner the same is to be performed we declare that what we claim is:

1. A readily transportable, assembled and dismantled twin-rail track for wheeled vehicles, comprising rail-forming beams, means for assembling and connecting said beams in end to end continuity to form said track comprising transverse bearer members for supporting said beams in parallel spaced relation, means for supporting said bearer members at predetermined heights above the ground, said beams having openings at their ends and each of said assembling and connecting means comprising a hinge member positionable upon one of said bearer members and comprising inter-hinged leaves of complementary cross-section to be receivable as sliding fits into said end openings of a pair of beams adjacently assembled in forming a rail, and means for attaching to the respective leaves of a hinge member with some freedom of movement in the direction of the length thereof, the proximated ends of two of said rail-forming beams assembled to said respective hinge member leaves.

2. A readily transportable, assembled and dismantled twin-rail track for wheeled vehicles, comprising rail-forming beams, means for assembling and connecting said beams in end to end continuity to form said track comprising transverse bearer members for supporting said beams in parallel spaced relation, means for supporting said bearer members at predetermined heights above the ground, said beams having openings at their ends and each of said assembling and connecting means comprising a hinge member positionable upon one of said bearer members and comprising inter-hinged leaves of complementary cross-section to be receivable as sliding fits into said end openings of a pair of beams adjacently assembled in forming a rail, and said means for supporting said bearer members including a pillar member of adjustable length and whereof the upper part is adapted to pass through said bearer member to serve above it as a pin of a hinge member located thereupon.

3. A readily transportable, assembled and dismantled twin-rail track for wheeled vehicles, comprising rail-forming beams, means for assembling and connecting said beams in end to end continuity to form said track comprising transverse bearer members for supporting said beams in parallel spaced relation, means for supporting said bearer members at predetermined heights above the ground, said beams having openings at their ends and each of said assembling and connecting means comprising a hinge member positionable upon one of said bearer members and comprising inter-hinged leaves of complementary cross-section to be receivable as sliding fits into said end openings of a pair of beams adjacently assembled in forming a rail, and each bearer member is of inverted channel section with end enlargements presenting top surfaces for receiving thereon said rail beam-connecting means and supporting, with freedom of relative movements between them, proximated beam ends connected thereby.

References Cited by the Examiner

UNITED STATES PATENTS

| 736,739 | 8/1903 | King | 105—414 |
| 1,415,448 | 5/1922 | Hudson | 104—126 |
| 1,560,714 | 11/1925 | Newdick | 238—166 |
| 2,768,588 | 10/1956 | Robb | 238—10 X |
| 2,941,724 | 6/1960 | Lutts | 238—10 |
| 2,952,411 | 9/1960 | Hand | 238—10 |
| 3,119,349 | 1/1964 | Hampton et al. | 104—134 |

FOREIGN PATENTS

| 648,288 | 8/1928 | France. |
| 577,882 | 6/1946 | Great Britain. |

ARTHUR L. LA POINT, *Primary Examiner.*

EUGENE G. BOTZ, *Examiner.*

J. A. COOKE, J. N. ERLICH, M. J. HILL, R. A. BERTSCH, *Assistant Examiners.*